Patented Apr. 25, 1939

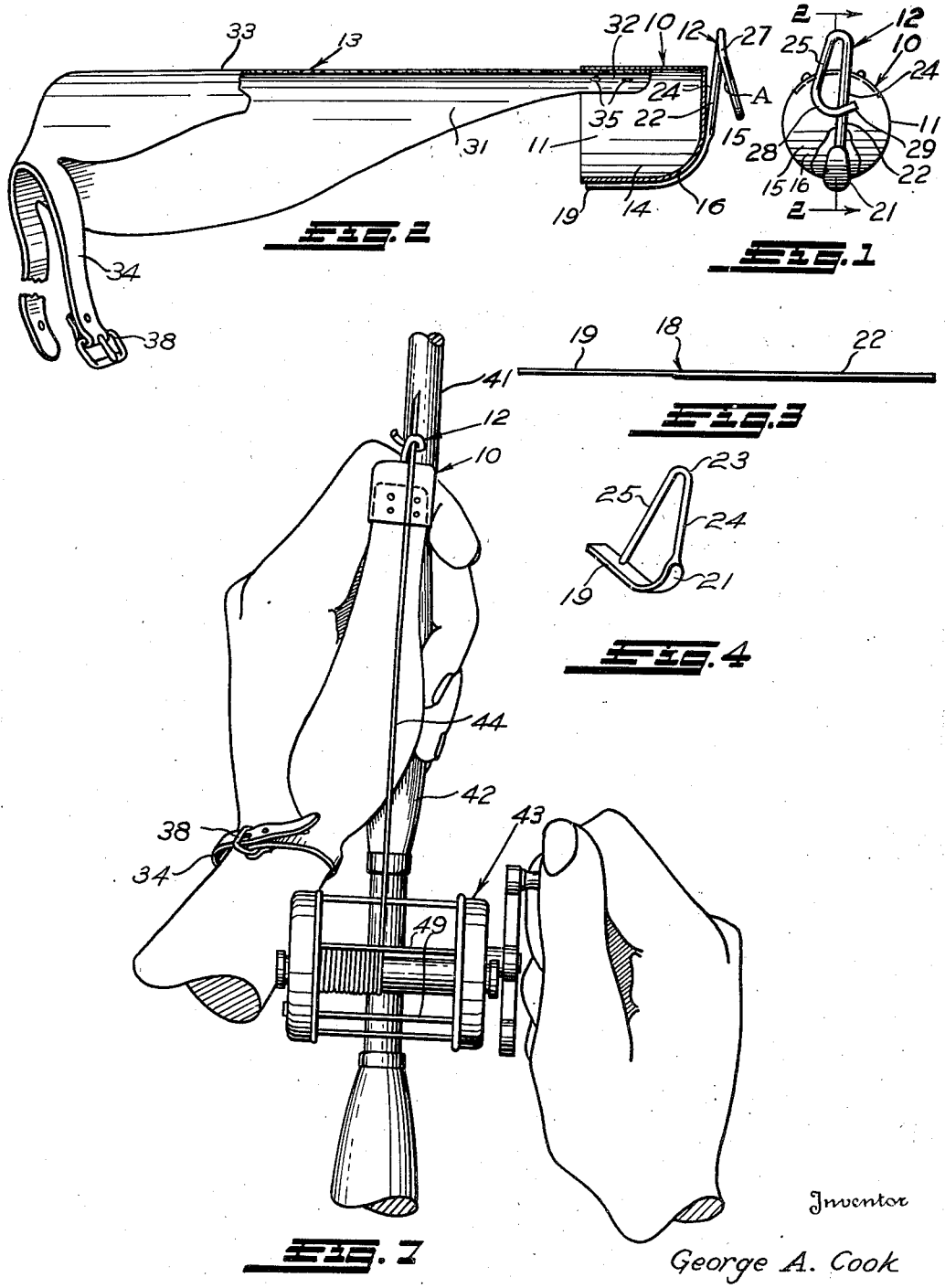

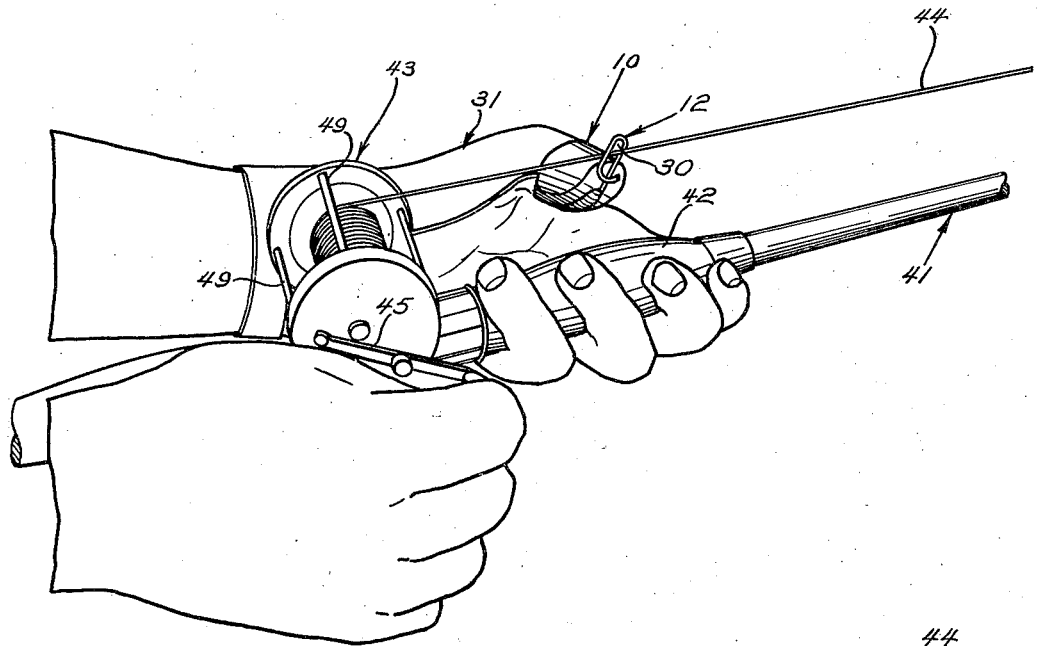
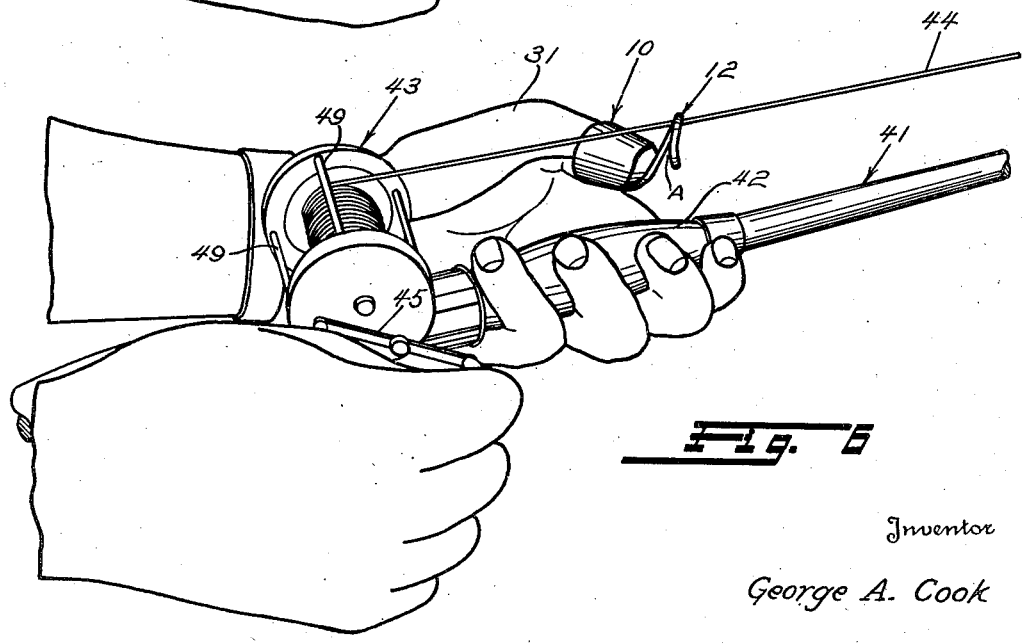

2,155,753

UNITED STATES PATENT OFFICE 2,155,753

FISHING LINE DISTRIBUTOR

George A. Cook, Washington, D. C.

Application March 15, 1937, Serial No. 131,021

4 Claims. (Cl. 43—25)

The present invention relates to a novel line distributor for use in properly distributing the convolutions of a line on a reel. More particularly, the present invention relates to a line distributor for use with fishing rods and reels.

The primary object of the present invention resides in the provision of a manually operable line distributor designed to permit proper reeling of a line in a simple and convenient manner.

A further important object of the present invention resides in the provision of a manually operable line distributor designed for use with a line and reel but having no mechanical connection therewith.

Another object of the present invention resides in the provision of a line distributor that is capable of being readily connected to a line for guiding the line on the reel but which is normally disconnected therefrom.

A further object of the present invention resides in the provision of a line distributor for use with fishing rods and reels which permits free unretarded running of the line from the reel when desired, for example, in casting, chuming, trolling or still-fishing.

Still another object of the present invention resides in the provision of a line distributor designed to be worn on the thumb in a manner to permit natural thumb movements to be used in distributing the line on a reel yet which is not easily fouled or accidently disengaged from the thumb or line when in use.

A further object of the present invention resides in the provision of a line distributor for use with fishing rods and reels which permits manual distribution of a line upon the reel without interfering with the proper gripping of the rod and operation of the reel.

Another object of the present invention resides in providing a line distributor designed to be worn on the thumb and a hand and finger protector secured to the distributor and designed to prevent injury to the hand or thumb by contact with the moving line.

A further object of the present invention resides in the provision of a line distributor comprising relatively few and simple parts which require little attention and are not likely to get out of order.

Other objects will appear from the appended claims and the following detailed description read in conjunction with the attached drawings wherein:

Figure 1 is an end view of a line distributor made in accordance with the present invention, Figure 2 is a longitudinal sectional view taken on line 2—2 of Figure 1, Figures 3 and 4 are detailed views showing various steps in the formation of the guide proper, Figure 5 is a perspective view illustrating the manner in which the line distributor of the present invention is associated with the line, Figure 6 is a perspective view illustrating one method of using the line distributor of the present invention, and Figure 7 is a perspective view illustrating a further method of using the line distributor of the present invention.

With continued reference to the drawings wherein like reference numerals are used to indicate the same parts throughout the several figures, the numeral 10 is used to indicate the line distributor of the present invention in its entirety.

Line distributor 10 comprises a hollow body member or thimble 11 designed to snugly fit the thumb or other digit of the user, a line guide 12 designed to receive and permit free passage of the line and a guard member 13 designed to protect the hand of the user and to retain the distributor 10 in place upon the thumb.

Body member 11 is preferably formed by a die pressing operation from a sheet metal blank of aluminum, nickle, brass, copper, silver, etc., of suitable character or suitably treated to prevent corrosion or deterioration upon being subjected to contact with salt water or other destructive mediums. It has been found desirable to produce body member 11 in the general configuration of the first joint of the thumb. As a consequence, portion 14 of body 11 is made of generally cylindrical form and merges into a rounded closed end 15. End 15 and the lower part of portion 14 are connected by a curved portion 16 corresponding to the undercurved portion of the first joint of the thumb.

Guide 12, preferably formed from a rounded tungsten or other hard steel wire blank 18 is then constructed in the following manner: Blank 18 is flattened in any suitable manner throughout a portion of its length as indicated at 19 and is then bent as indicated at 21. Bent portion 21 is curved to the same extent as portion 16 of body 11 in order that a close engagement of portion 19 and body member 11 may be effected.

The unflattened portion 22 of blank 18 is then bent out of the plane or portion 19 at 23 to form legs 24 and 25. Leg 25 is then bent away from portion 19 of blank 18 at 27, so that leg 25 is slightly offset forwardly of leg 24 as seen in Figure 2. The free end of leg 25 is then bent at 28 so that the extreme end 29 thereof is disposed in spaced overlapping relation to leg 24 as clearly seen from Figures 1 and 2. It will, therefore, be clear that the guide loop 30 is formed by bending the wire to a form approximating one turn of a helix.

The guide 12 formed in this manner is then secured to body member 11 by placing flattened portion 19 in contact with the lower portion 14 and curved portion 16 of member 11 and securing it thereto by welding, soldering, or the like.

While body member 11 and guide 12 are preferably made in the manner just described and joined together by welding, soldering or the like, it is to be understood that any suitable manner of constructing these parts may be resorted to without departing from the spirit of the present invention, the only requisite being that a member capable of being worn on the hand and preferably the thumb of the user and having a formation for readily receiving and guiding the line, be provided.

Member 11 and guide 12 are capable of use at this time in the manner contemplated by this invention. However, it has been found desirable to connect member 11 to a glove, finger stall or the like in order to securely associate the distributor 10 with and protect the hand of the user. To this end a finger stall 31 having a relatively short flexible finger encircling portion 32 and a long relatively wide upper protecting surface 33 terminating in a wrist band 34 is secured in member 11 by rivets or the like 35.

Surface 33 preferably extends over the upper portion of the thumb and a considerable portion of the hand in order to protect the flesh from being burned by contact with the moving line. Finger stall 31 may be made of any suitable material such as leather, suede, cotton, linen, etc., and is preferably provided with a buckle as shown at 38 in order to secure it around the wrist.

The line distributor herein described, while it may be used in any case where manual distribution of a line is desired, is particularly designed for use with fishing lines and reels. It is, accordingly, in this latter connection that the use of distributor 10 will now be described.

In Figures 5, 6 and 7, a fishing rod 41 having the conventional gripping portion 42, reel 43 and line 44 thereon is illustrated. When a cast is to be made or the line is running out when casting, chuming, trolling or still fishing, distributor 10 is disconnected from line 44 and the line is permitted to move off of reel 43 without any retarding effect due to the distributor. After the desired length of line is paid out, the rod is held in any approved manner, such as that illustrated, with the four fingers and palm of the left hand grasping and supporting the rod at 42 and the right hand grasping the reel crank lever 45 and being free to operate the reel.

With distributor 10 secured in place on the left hand as shown in Figures 5, 6 and 7 and the rod grasped as shown in Figure 5 with the thumb extending in a direction substantially at right angles to the rod and line and guide 12 with its legs 24 and 25 paralleling line 44, the thumb is raised and moved toward line 44. During this movement rod 44 is still grasped by the four fingers and palm and distributor 10 is brought into position with the V-shaped opening A between legs 24 and 25 (see Figures 2 and 5) directly above line 44. The thumb is then lowered to the position illustrated in Figure 5 wherein line 44 is disposed well up in opening A. The thumb is then turned to a position approximately parallel to rod 41 and line 44 as seen in Figure 6. This turning movement of the thumb causes line 44 to be shifted from opening A to guide loop 30 (see Figures 1 and 5), the final guiding position.

As the line is drawn in upon the reel in retrieving the line or playing a fish, the thumb is moved to and fro about the second joint thereby moving the line 44 back and forth across the reel in a right to left direction to distribute the line on the reel. Since the guide is sufficiently far enough ahead of the reel, the line is shifted the entire width of the reel by the to and fro movement of the thumb. As a consequence, the line is wound upon the reel in level convolutions without danger of the line freezing by contacting the cross-bars 49 of the reel. Furthermore, due to the fact that the line is neatly and evenly distributed on the reel, the danger of back-lashing of the line when casting etc. is obviated. This accurate reeling of the line by the to and fro motion of the thumb soon becomes a habit with the user and permits him to focus his full attention on playing the fish.

It is to be noted that the rod is continuously and strongly grasped between the four fingers and the palm while the thumb alone is moved to guide the line upon the reel. Since this movement of the thumb is a more or less natural one, the thumb is not likely to be strained or tired. The guide, furthermore, may be turned bodily on the thumb in order to accommodate personal characteristics of individuals as to the most comfortable position of the thumb.

Line 44, furthermore, cannot free itself from guide loop 30 when slack occurs therein, due to the fish rising or swimming toward the fisherman since the end 29 of guide 12 extends across leg 24 and thus presents a completely closed loop when viewed in a direction normal to the passage of the line. The freeing of the line when a pull is exerted thereon by the fish is also prevented due to the fact that the upper curved portion 23 of line guide 12 is completely closed and slightly below the normal plane of the line from the reel to the first line guide on the rod.

While the guide 12 of the present invention, especially on the working surface 23, is highly polished to prevent cutting of the line and wear of the guide, it is to be understood that the curved portion 23 may be provided with the well known agate guide material or other suitable anti-friction material to increase the life of guide 12 and obviate the possibility of cutting the line.

Although the present line distributor may be used in the manner illustrated in Figure 6, it is also adapted for use in the manner illustrated in Figure 7. In this figure the thumb is shown in a position above the rod in alignment with a plane passing vertically through line 44. Since this latter position of the hand permits of a more natural movement of the thumb, it is to be preferred to the manner of use illustrated in Figure 6.

The distributor of the present invention is capable of use on either the left hand or the right hand without modification. In this connection, however, when used on the right hand the line is inserted by turning the thumb over and positioning the guide from below the line and then turning the thumb over to its natural position. It is preferable, however, to manufacture the guides for left hand or right hand users. The only change necessary is that bend 23 be made in the opposite direction when manufacturing a right hand distributor.

If desired, the guide 12 may be secured to member 11 by means of bolts in such a manner that shifting of guide 12 with respect to member 11 may be effected to suit the individual desires of the user and the line can thus be guided from the sides of the member 11 rather than the top as illustrated in the drawings.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A device for manually distributing a line on a reel and protecting the hand of the user from injury by contact with the moving line, comprising in combination a member supported by one digit of the hand, a line guide secured to said member and a member for covering the part of said hand and said digit that is likely to be injured by contact with the line.

2. A salt water fishing line guide comprising a hollow sheet metal thimble adapted to be worn on the thumb and a line guide comprising a round wire-like element having a flattened portion secured to said thimble and a guide loop providing completely closed sides when viewed in a direction paralleling the axis of the thimble and disposed in a plane normal to the axis of said thimble.

3. A line distributor for use in distributing a fishing line on a reel when playing a fish or retrieving the line, comprising a thimble adapted to be worn on the thumb and a line guide on said thimble comprising a wire-like element bent to provide a guide loop formed by completely closed sides when viewed in a direction paralleling the axis of the thimble and at least one open side when viewed in a direction normal to the axis of said thimble whereby said line guide may be readily associated with said line or disassociated from said line by disposing the thimble in a direction normal to the line and raising or lowering it while accidental disassociation of the line and guide is prevented when the thimble is disposed in its normal operative position paralleling the line.

4. A device for guiding a line on a reel comprising a hollow member for receiving the thumb, a line guide on said member for freely receiving the line and guiding it onto the reel and a finger stall secured to said hollow member for protecting the thumb and hand and securing the hollow member on the thumb.

GEORGE A. COOK.